US009411362B2

(12) United States Patent
Feero et al.

(10) Patent No.: US 9,411,362 B2
(45) Date of Patent: Aug. 9, 2016

(54) STORAGE CIRCUITRY AND METHOD FOR PROPAGATING DATA VALUES ACROSS A CLOCK BOUNDARY

(71) Applicant: ARM LIMITED, Cambridge (GB)

(72) Inventors: Brett Stanley Feero, Austin, TX (US); Michael Alan Filippo, Driftwood, TX (US)

(73) Assignee: ARM Limited, Cambridge (GB)

( * ) Notice: Subject to any disclaimer, the term of this patent is extended or adjusted under 35 U.S.C. 154(b) by 294 days.

(21) Appl. No.: 14/193,492

(22) Filed: Feb. 28, 2014

(65) Prior Publication Data
US 2015/0248138 A1 Sep. 3, 2015

(51) Int. Cl.
*G06F 12/00* (2006.01)
*G06F 1/12* (2006.01)
*G06F 12/08* (2016.01)
*G06F 1/32* (2006.01)

(52) U.S. Cl.
CPC .............. *G06F 1/12* (2013.01); *G06F 1/3225* (2013.01); *G06F 1/3275* (2013.01); *G06F 12/0835* (2013.01); *G06F 2212/1028* (2013.01); *Y02B 60/1225* (2013.01); *Y02B 60/1228* (2013.01)

(58) Field of Classification Search
CPC . G06F 1/3275; G06F 1/3225; G06F 12/0835; G06F 12/0897; G06F 2212/1028; Y02B 60/1228; Y02B 60/1225
USPC ........................................................ 711/133
See application file for complete search history.

(56) References Cited

PUBLICATIONS

D.J. Kinniment et al., "Low Latency Synchronization Through Speculation", School of Electrical and Electric and Computer Engineering, 9 pages.

*Primary Examiner* — Matthew Bradley
(74) *Attorney, Agent, or Firm* — Nixon & Vanderhye P.C.

(57) ABSTRACT

A storage circuit and method are provided for propagating data values across a clock boundary between a first clock domain and a second clock domain. A storage structure is provided with at least one entry, and write circuitry performs write operations in the first clock domain, where each write operation writes a data value into an entry of the storage structure identified by a write pointer. The write circuitry alters the write pointer between each write operation. Write pointer synchronization circuitry then receives the write pointer and synchronizes the write pointer indication to the second clock domain over a predetermined number of clock cycles of the second clock domain. Read circuitry performs read operations in the second clock domain, with each read operation reading a data value from an entry of the storage structure identified by a read pointer. However, for a read operation to be performed, it is necessary that the synchronized write pointer indication indicates that there is a data value written into the storage structure that is available to be read. Early update circuitry is configured, for a write operation, to alter the write pointer indication provided to the write pointer synchronization circuitry a number of clock cycles of the first clock domain before the write operation is performed. That number of clock cycles is chosen dependent on the difference in clock speed between the first clock domain and the second clock domain, and the predetermined number of clock cycles of the second clock domain taken by the write pointer synchronization circuitry to synchronize the write pointer indication to the second clock domain. Such an approach enables at least a part of the latency of the write pointer synchronization circuitry to be hidden, thereby improving performance of the storage circuitry.

16 Claims, 6 Drawing Sheets

STORAGE CIRCUITRY AND METHOD FOR PROPAGATING DATA VALUES ACROSS A CLOCK BOUNDARY

BACKGROUND OF THE INVENTION

1. Field of the Invention

The present invention relates to a storage circuitry and method for propagating data values across a clock boundary.

2. Description of the Prior Art

It is known to use storage structures such as FIFOs (First-In-First-Out storage) to propagate data values across a clock boundary between a first clock domain and a second clock domain. The storage circuitry incorporating such a FIFO (or other storage structure) is often referred to as an asynchronous storage circuit, since data is typically written into the FIFO asynchronously to the reading of data from the FIFO. For the purposes of the present application, the first and second clock domains will be considered to be asynchronous not only in situations the clock edges in the first clock domain are generally unaligned with the clock edges in the second clock domain (for example where the clock frequencies in the two clock domains are unrelated), but also in situations where the clock frequency in one clock domain is an integer multiple of the clock frequency in the other clock domain and certain clock edges are aligned.

A write pointer is typically used to identify an entry in the FIFO to be written to, and similarly a read pointer is used to identify an entry to be read from. In accordance with the conventional technique, when queuing data in the FIFO for propagation across the clock boundary, the data is written into the FIFO using a current write pointer value, and at the same time that write pointer value is incremented, with the incremented version of the write pointer then being propagated across the clock boundary to read circuitry in order to allow the read circuitry to determine that there is data to be read from the FIFO. By incrementing the write pointer at the same time that write data is written into the FIFO, this ensures that when the read circuitry within the storage circuitry reads the data from the FIFO, that data will be valid and stable. In particular, on the read side, by the time it is perceived that the write pointer has changed, it will be guaranteed that the write data is available to be read.

However, in order for the read circuitry to correctly capture the write pointer, it must first be passed through write pointer synchronisation circuitry to reduce the probability of metastability in the write pointer, that could otherwise arise due to the differences between the clocks of the first and second clock domains (the write pointer having been incremented in the first clock domain, but then sampled by the read circuitry in the second clock domain).

At the relatively high frequencies (1.5 GHz and above) that are used in current process technologies, such write pointer synchronisation circuitry may be 3 or 4 flops long in order to reduce the probability of metastability to a satisfactory degree, and due to this the use of asynchronous storage circuits can be very expensive from a latency perspective.

Some research has been undertaken with respect to the design of the write pointer synchronisation circuitry, with the aim of trying to optimise the synchronising circuitry and thus reduce the latency, see for example the paper entitled "Low latency synchronization through speculation" by A Kinniment et al, Proceedings of the 14$^{th}$ International Workshop on Power and Timing Modeling, Optimization and Simulation (PATMOS), 2004, pages 278-288. However, such techniques can be costly and complex, and accordingly it would be desirable to provide an alternative mechanism for improving the performance of such storage circuits including write pointer synchronisation circuitry.

SUMMARY OF THE INVENTION

Viewed from a first aspect the present invention provides storage circuitry for propagating data values across a clock boundary between a first clock domain and a second clock domain, comprising: a storage structure having at least one entry; write circuitry configured to perform write operations in the first clock domain, each write operation writing a data value into an entry of the storage structure identified by a write pointer, and the write circuitry being configured to alter the write pointer between each write operation; write pointer synchronisation circuitry configured to receive a write pointer indication and to synchronise the write pointer indication to the second clock domain over a predetermined number of clock cycles of the second clock domain; read circuitry configured to perform read operations in the second clock domain, each read operation reading a data value from an entry of the storage structure identified by a read pointer, under a condition that the synchronised write pointer indication indicates that there is a data value written into the storage structure that is available to be read; and early update circuitry configured, for a write operation, to alter the write pointer indication provided to the write pointer synchronisation circuitry a number of clock cycles of the first clock domain before the write operation is performed, where said number of clock cycles is chosen dependent on a difference in clock speed between the first clock domain and the second clock domain and the predetermined number of clock cycles of the second clock domain over which the write pointer indication is synchronised to the second clock domain.

In accordance with the present invention, early update circuitry is provided which is arranged to alter the write pointer indication provided to the write pointer synchronisation circuitry a number of clock cycles of the first clock domain before the write operation is actually performed. Based on knowledge of the predetermined number of clock cycles of the second clock domain that the write pointer synchronisation circuitry uses to synchronise the write pointer indication to the second clock domain, and a knowledge of the difference in clock speed between the first clock domain and the second clock domain, the number of clock cycles of the first clock domain ahead of the write operation that the write pointer indication is altered is chosen to ensure that, even though the write pointer indication has been updated early, it can still be guaranteed that the write data will be valid and stable by the time it is read by the read circuitry. The number of clock cycles of the first clock domain ahead of the write operation that the write pointer indication is altered may be predefined, for example by a value stored in a configuration register, or may be determined on the fly having regard to the above-mentioned factors.

In contrast to prior art techniques that seek to optimise the write pointer synchronisation circuitry in order to seek to reduce latency, the technique of the present invention hides some of the latency of the write pointer synchronisation circuitry by decoupling the incrementing of the write pointer indication from the actual writing of the data payload into the storage structure. This enables a simple and effective mechanism for increasing the performance of the storage circuitry.

In one embodiment, the first clock domain has a clock speed equal or greater to the clock speed of the second clock domain. In such situations, this ensures that it is safe to update the write pointer indication early, whilst ensuring that the write data will be valid and stable by the time it is read by the read circuitry operating in the second clock domain.

In one embodiment, the predetermined number of clock cycles of the second clock domain over which the write pointer indication is synchronised to the second clock domain is N clock cycles, and the early update circuitry is configured to alter the write pointer indication provided to the write pointer synchronisation circuitry up to N-1 clock cycles of the first clock domain before the write operation is performed.

Considering the example where it is known that the clock in the first clock domain is running at least as fast as the clock in the second clock domain, then once it is known that the write pointer synchronisation circuitry takes N clock cycles of the second clock domain to synchronise the write pointer, this means that the write data would be stable for at least N-1 clock cycles in the write domain were it to be written into the FIFO at the same time as the write pointer was incremented. This knowledge can be used in order to defer writing the write data for up to N-1 clock cycles after the write pointer indication is adjusted.

Furthermore, it has been found that even in embodiments where the clock speed in the first clock domain is not necessarily equal to or greater than the clock speed in the second clock domain, there can still be instances where it is possible to update the write pointer indication early, dependent upon how many cycles in the second clock domain the write pointer synchronisation circuitry takes to synchronise the write pointer indication, and the relative difference between the speeds of the clocks of the first and second clock domains.

Whilst the storage structure can in principle have only a single entry, with the write pointer and read pointer being arranged to alternate between two different values as each write operation and read operation is performed, respectively, where both of those values effectively point to the same entry, in an alternative embodiment the storage structure comprises a plurality of entries, and the write pointer is altered between each write operation so that each write operation is performed in respect of a different entry to a preceding write operation.

There are a number of ways in which the read circuitry can determine whether the synchronised write pointer indication indicates that there is a data value available to be read. In one embodiment, the read circuitry is configured to alter the read pointer between each read operation, and the condition that the synchronised write pointer indication indicates that there is a data value written into the storage structure that is available to be read is detected when the read pointer is different to the write pointer.

In one embodiment, since the write pointer indication is updated early, before the write operation is performed, it is necessary for a write to take place in respect of the storage structure, in order to ensure that the read circuitry operates correctly. An issue that then arises is how to deal with a situation where, subsequent to early update of the write pointer indication, a decision is taken not to proceed with the write operation. In accordance with one embodiment, this situation is accommodated by allowing dummy data to be written into the storage structure under such conditions. In particular, in one embodiment, each entry of the storage structure has a valid field whose value indicates whether the data value stored therein is real data or dummy data. The write circuitry is responsive to a write operation being terminated after the early update circuitry has altered the write pointer indication provided to the write pointer synchronisation circuitry, but before the entry of the storage structure identified by the write pointer has been written to, to write dummy data into the identified entry and to set the value of the valid field to identify that dummy data is stored in that identified entry.

The read circuitry will then in due course determine from the synchronised write pointer indication that there is a data value available to be read, and will access the relevant entry identified by the read pointer in order to read that data. However, in one embodiment, the read circuitry is responsive to accessing an entry whose valid field indicates that dummy data is stored therein, to prevent the data value of that accessed entry from being output from the storage circuitry. This provides a simple and effective mechanism for ensuring correct operation of the read circuitry, even in situations where the write operation is terminated following update of the write pointer indication.

The storage structure can take a variety of forms, but in one embodiment is a FIFO (First-In-First-Out) storage structure.

In one embodiment, the storage circuitry is only used in implementations where the difference in clock speed between the first clock domain and the second clock domain, combined with knowledge of the number of clock cycles of the second clock domain taken by the write pointer synchronisation circuitry to synchronise the write pointer indication, indicates that it is safe to update the write pointer indication ahead of the actual write operation. However, in an alternative embodiment, the storage circuitry may further include a mechanism to detect when it is no longer safe to update the write pointer indication early, and under those conditions cause the write pointer indication not to be updated until the write operation is performed. In particular, in one embodiment the storage circuitry comprises detection circuitry configured to detect a predetermined condition and to disable the early update circuitry upon detection of said predetermined condition. Upon disabling the early update circuitry, the write pointer indication provided to the write pointer synchronisation circuitry is not updated until the write operation is performed.

The predetermined condition can take a variety of forms, but in one embodiment the predetermined condition is a condition indicating that the clock speed of the first clock domain is slower than the clock speed of the second clock domain.

There are many use cases for the storage circuitry of the above described embodiments. However, one use case is in connection with a cache, and in particular a cache controller for the cache may be configured to incorporate such storage circuitry.

There are various data values which may need to be transferred across a clock boundary in such a cache controller implementation. For example, in one embodiment the cache operates in the first clock domain and the data values comprise access requests to be propagated to a storage component in the second clock domain following detection of a miss in the cache.

As another example, the cache may operate in the first clock domain and the data values comprise data evicted from the cache to a storage component in the second clock domain during an eviction operation.

The storage component to which the data values are propagated from the cache controller can take a variety of forms, but in one embodiment may comprise a further cache, such as a cache lower in a cache hierarchy than the cache with which the cache controller is associated.

Viewed from a second aspect, the present invention provides a method of propagating data values across a clock boundary between a first clock domain and a second clock domain in a data processing system, comprising: providing a storage structure having at least one entry; performing write operations in the first clock domain, each write operation writing a data value into an entry of the storage structure identified by a write pointer, and the write pointer being altered between each write operation; employing write pointer synchronisation circuitry to receive a write pointer indication and to synchronise the write pointer indication to the second clock domain over a predetermined number of clock cycles of the second clock domain; performing read operations in the second clock domain, each read operation reading a data value from an entry of the storage structure identified by a read pointer, under a condition that the synchronised write pointer indication indicates that there is a data value written into the storage structure that is available to be read; and for a write operation, altering the write pointer indication provided to the write pointer synchronisation circuitry a number of clock cycles of the first clock domain before the write operation is performed, where said number of clock cycles is chosen dependent on a difference in clock speed between the first clock domain and the second clock domain and the predetermined number of clock cycles of the second clock domain over which the write pointer indication is synchronised to the second clock domain.

Viewed from a third aspect the present invention provides storage circuitry for propagating data values across a clock boundary between a first clock domain and a second clock domain, comprising: a storage means for providing at least one entry; write means for performing write operations in the first clock domain, each write operation writing a data value into an entry of the storage means identified by a write pointer, and the write means further for altering the write pointer between each write operation; write pointer synchronisation means for receiving a write pointer indication and for synchronising the write pointer indication to the second clock domain over a predetermined number of clock cycles of the second clock domain; read means for performing read operations in the second clock domain, each read operation reading a data value from an entry of the storage means identified by a read pointer, under a condition that the synchronised write pointer indication indicates that there is a data value written into the storage means that is available to be read; and early update means for altering, for a write operation, the write pointer indication provided to the write pointer synchronisation means a number of clock cycles of the first clock domain before the write operation is performed, where said number of clock cycles is chosen dependent on a difference in clock speed between the first clock domain and the second clock domain and the predetermined number of clock cycles of the second clock domain over which the write pointer indication is synchronised to the second clock domain.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 1:
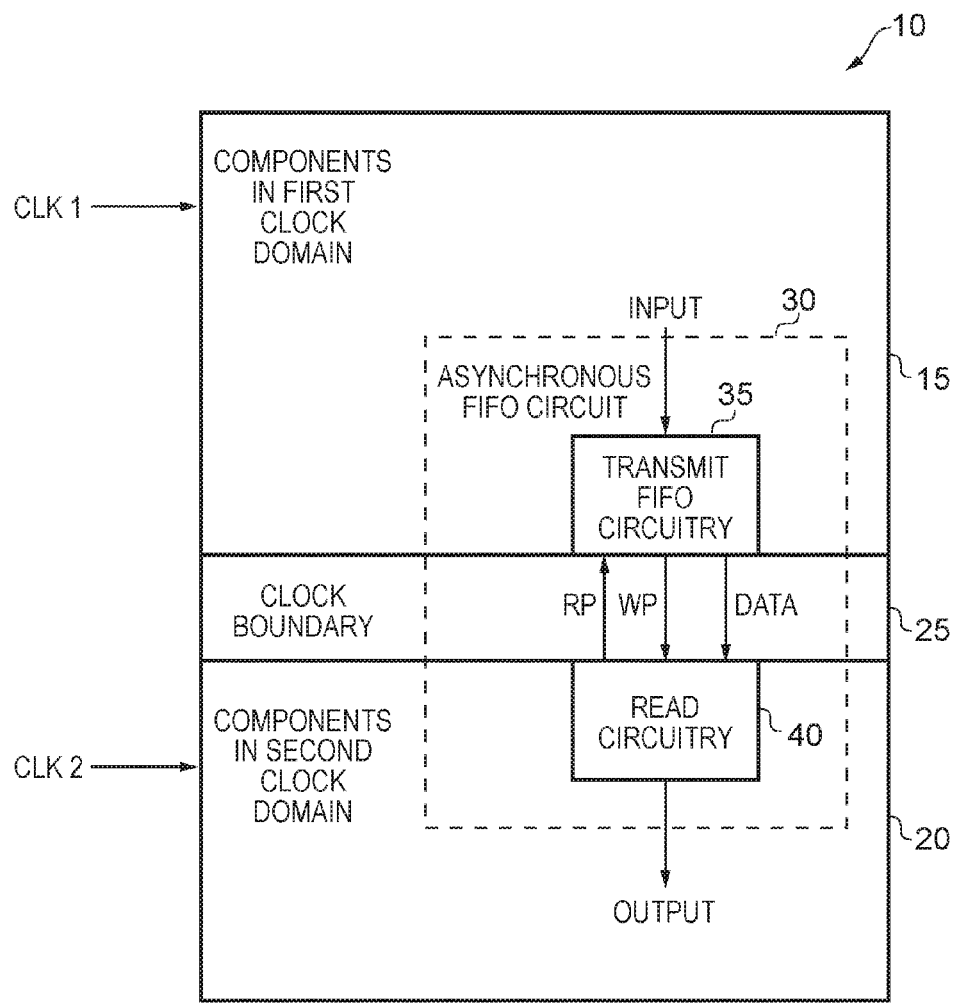
FIG. 1 is a block diagram of a system including an asynchronous FIFO circuit in accordance with one embodiment.

FIG. 1 is a diagram schematically illustrating a system 10 in which an asynchronous FIFO circuit 30 in accordance with one embodiment is utilised. The system 10 comprises a number of components 15 provided in a first clock domain, and a number of components 20 in a second clock domain operating from a different clock signal to the first clock domain. In this example, it is assumed that the asynchronous FIFO circuit 30 is used to propagate data from a component in the first clock domain to a component in the second clock domain.

The asynchronous FIFO circuit 30 consists of transmit FIFO circuitry 35 provided in the first clock domain, and read circuitry 40 provided in the second clock domain. In this embodiment, a FIFO storage structure is provided as part of the transmit FIFO circuitry 35, along with associated write circuitry and various control circuits. The read circuitry 40 includes the circuit elements used to read data out of the FIFO in dependence on a read pointer, and various other control elements, such as a write pointer synchronisation circuit. In particular, the transmit FIFO circuitry 35 will output a write pointer indication to the read circuitry 40, which in one embodiment will be compared with a read pointer within the read circuitry in order to determine whether there is data to be read from the FIFO. In one embodiment, this is the case if the write pointer as propagated from the transmit FIFO circuitry 35 over the clock boundary 25 is determined by the read circuitry to be different to the current read pointer. The write pointer synchronisation circuitry is used to synchronise the received write pointer indication with the second clock domain prior to it being compared with the current read pointer.

As shown in FIG. 1, the read pointer is also propagated back over the clock boundary 25 from the second clock domain to the first clock domain, where it is used to determine situations where the FIFO is full, and accordingly cannot accept any more write data.

Figure 2:
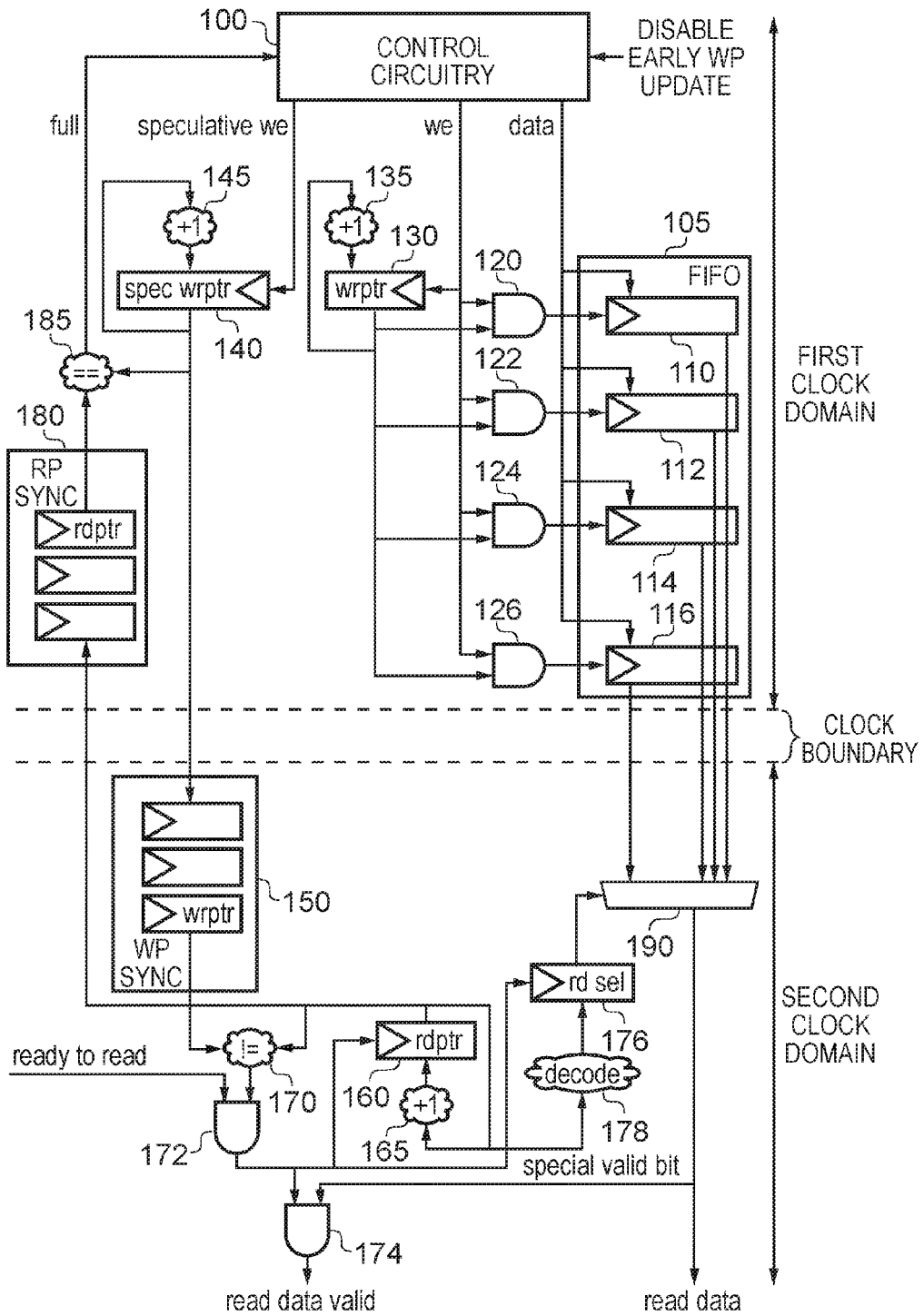
FIG. 2 is a diagram illustrating an asynchronous FIFO circuit in accordance with one embodiment.

FIG. 2 is a block diagram illustrating in more detail components provided within the asynchronous FIFO circuit 30 of FIG. 1. As shown, the FIFO 105 is provided with write data from the control circuitry 100, the FIFO 105 containing a plurality of entries 110, 112, 114, 116 that are activated by the output of corresponding AND gates 120, 122, 124, 126. A write pointer is stored in the register 130 identifying the next FIFO entry to be written to, and the current contents of the register 130 are used to set the second input of one of the AND gates 120, 122, 124, 126 to a logic 1 value. The output from the register 130 can in some embodiments be used directly for this purpose (for example if the write pointer is a one hot vector), or alternatively the write pointer value can be routed via decode logic if decoding is needed to identify from the write pointer value which of the AND gates 120, 122, 124, 126 should have their second input set to a logic 1 value. The other input of all of the AND gates is set to a logic 1 value by an asserted write enable signal, and accordingly it will be seen that once the write enable signal is asserted, the data value provided on the data line will be written into one of the entries of the FIFO, as identified by the contents of the register 130. Also, since the output from the write pointer is incremented by the increment logic 135, then on assertion of the write enable signal, the current write pointer contents in the register 130 will be updated with the incremented write pointer to identify a next FIFO entry to be written to.

In accordance with the described embodiment, the write pointer maintained in the register 130 is not the write pointer that gets propagated over the clock boundary to the read circuitry 40. Instead, a speculative write pointer is kept within the register 140, which also has associated increment logic 145. The control circuitry 100 is arranged to issue a speculative write enable signal a certain number of clock signals before the write enable signal used to perform the write operation in the FIFO. As a result, the speculative write pointer will then be incremented by the increment circuit 145, and propagated over the clock boundary to the write pointer synchronisation circuitry 150.

The write pointer synchronisation circuitry comprises a series of flops, in the example of FIG. 2 three flops being shown. By passing the write pointer indication output by the register 140 through the series of flops, the write pointer indication is synchronised to the clock signal of the second clock domain. Once it has been synchronised, it can be compared to the current read pointer held in the register 160, using the comparison circuitry 170. In the event that the write pointer indication as synchronised by the second clock domain is not equal to the read pointer indication, then a logic 1 value is asserted to the AND gate 172. Assuming the relevant components in the second clock domain are ready to read the data from the FIFO (for example the component in the second clock domain that is to receive the data output from the asynchronous FIFO circuit may issue a ready signal to identify whether it is ready to receive data or not), then the other input of the AND gate will be set to a logic 1 value, causing a logic 1 value to be output as a data valid signal. In one embodiment, the output from the AND gate 172 will directly form the valid signal, but in another embodiment, as indicated in FIG. 2, that signal is qualified by a further valid bit associated with the value read out from the FIFO, as will be discussed in more detail later.

As shown in FIG. 2, the current contents of the read pointer in the register 160 are incremented by the increment circuit 165, and are also decoded by the decode component 178 to identify a mux select signal for the multiplexer 190. On assertion of a logic one value from the AND gate 172, this activates both of the storage elements 160, 176 to update their contents based on the outputs from the increment logic 165 and decode logic 178, respectively. As a result, this will cause a multiplexer control signal (also referred to herein as a read enable signal) to be issued to the multiplexer 190 to select the contents of the appropriate FIFO entry for output as the read data, and for the contents of the read pointer register 160 to be updated.

The updated read pointer is also forwarded via the read pointer synchronisation circuitry 180 in the first clock domain, which, like the write pointer synchronisation circuitry 150, includes a number of flops for synchronising the received signal. In particular, the read pointer synchronisation circuitry 180 synchronises the read pointer with the first clock domain, whereafter it is compared by element 185 with the current value output from the storage element 140. In the event that the comparison indicates that the FIFO is full, then a control signal is accordingly issued to the control circuitry 100. It will be appreciated that any of a number of well-known techniques can be used to differentiate between a full and an empty FIFO. For example, in one embodiment the pointers are made 1 bit larger than otherwise required, where all bits except one bit (for example the most significant bit) are used to index the FIFO. Using these pointers, every FIFO entry is used twice before the pointers completely roll over. If the pointers are exactly equal, then the FIFO is empty. If all bits except the most significant bit are equal then the FIFO is full.

Whilst the comparison circuitry 185 indicates that the FIFO is full, the control circuitry will not assert the speculative write enable signal. This will also prevent the associated write enable signal being asserted along with the write data. In situations where the speculative write enable signal has been asserted, and the FIFO full signal is then received before the associated write enable and write data are asserted, then the associated write enable will be asserted and the write data output, given that the associated speculative write enable signal has already been asserted.

By arranging for a speculative write enable signal to be asserted a number of clock cycles before the write operation is actually performed, this enables the latency associated with the write pointer synchronisation circuitry 150 to be at least partially hidden, thereby significantly increasing the performance of the write operations.

The control circuitry 100 includes early update circuitry that is configured, for a write operation, to assert the speculative write enable signal a number of clock cycles before the write enable signal, to thereby cause the write pointer indication output from the storage element 140 to be updated a number of clock cycles before the write operation is performed. The control circuitry determines how many clock cycles early the speculative write enable signal can be asserted, taking account of the difference in clock speed between the first clock domain and the second clock domain, and the number of clock cycles over which the write pointer indication is synchronised by the write pointer synchronisation circuitry 150 in the second clock domain. The number of clock cycles of the first clock domain that the speculative write enable signal is asserted ahead of the write enable signal may be predefined, for example by a value stored in a configuration register within the control circuitry 100, or may be determined on the fly having regard to the above-mentioned factors.

If the example is considered where it is known that the clock in the first clock domain is equal or faster than the clock in the second clock domain, and it is known that it takes N clock cycles in the second clock domain for the write pointer synchronisation circuitry to synchronise the write pointer indication with the second clock domain (in the example of FIG. 2, N being 3 clock cycles), then this means that the write data will also be stable for at least N-1 clock cycles in the first clock domain, were it to be written into the FIFO at the same time as the output from the storage element 140 were incremented. Accordingly, this knowledge can be used to defer writing the data for up to N-1 clock cycles of the first clock domain after the speculative write enable signal is asserted to increment the write pointer indication provided to the write pointer synchronisation circuitry 150. This hence serves to hide the latency associated with the write pointer synchronisation circuitry 150, and thereby significantly increases performance.

If the clock speed in the first clock domain is guaranteed to be at least as fast as the clock speed in the second clock domain, then it will always be safe to update the write pointer indication one or more cycles before the write operation is actually performed in the FIFO. However, it will also be appreciated that even in situations where the clock in the first clock domain is a little slower than the clock in the second clock domain, it may still be possible to update the write pointer indication early, dependent on the number of clock cycles in the second clock domain required by the write pointer synchronisation circuitry 150 in order to synchronise the write pointer indication with the second clock domain.

In one embodiment one or more predetermined trigger conditions are used to disable the early write pointer update functionality described above, such disable signals being input to the control circuitry 100. In one particular embodiment, such a disable signal is set if it is detected that the clock speed in the first clock domain is transitioning to a value that is less than the clock speed in the second clock domain. Upon receipt of such a disable signal, the early update circuitry within the control circuitry 100 is disabled, and instead the speculative write enable and the write enable signals are asserted at the same time, in order to cause the write pointer indication to be updated at the same time as the write data is written into the FIFO. This hence ensures correct operation even under circumstances where it would no longer be safe to early update the write pointer indication provided to the second clock domain.

As mentioned earlier, the read data valid bit that accompanies the read data output from the asynchronous FIFO may in one embodiment be directly determined by the output of the AND gate 172. However, in an alternative embodiment, the additional AND gate 174 is used, along with a special valid bit maintained in the entries of the FIFOs, to generate the read data valid bit, in order to accommodate a situation where a write operation is terminated before write data is written into the FIFO, but after the speculative write enable signal has been asserted. In this instance, to ensure correct operation of the read circuitry, it is necessary for some data to get written into the identified entry in the FIFO 105. Accordingly, in one embodiment, each entry in the FIFO 105 has a valid field whose valid bit is set to indicate whether the data value stored therein is real data or dummy data. In the above scenario where the speculative write enable signal has been asserted, but the write operation is then terminated before write data is written into the FIFO, the control circuitry 100 is arranged to output dummy data along with the asserted write enable signal, and will also identify a value for the valid field that will identify that the data stored in the identified entry of the FIFO is dummy data.

The read operation then occurs in the same manner as discussed earlier, but the valid bit read out from the relevant FIFO entry is used to provide an input to the AND gate 174. Accordingly, only if that valid bit is set to identify that the data is true data, rather than dummy data, will an asserted read data valid bit be output by the AND gate 174. In the absence of an asserted read data valid bit, any read data output by the multiplexer 190 will be ignored.

Figure 3:
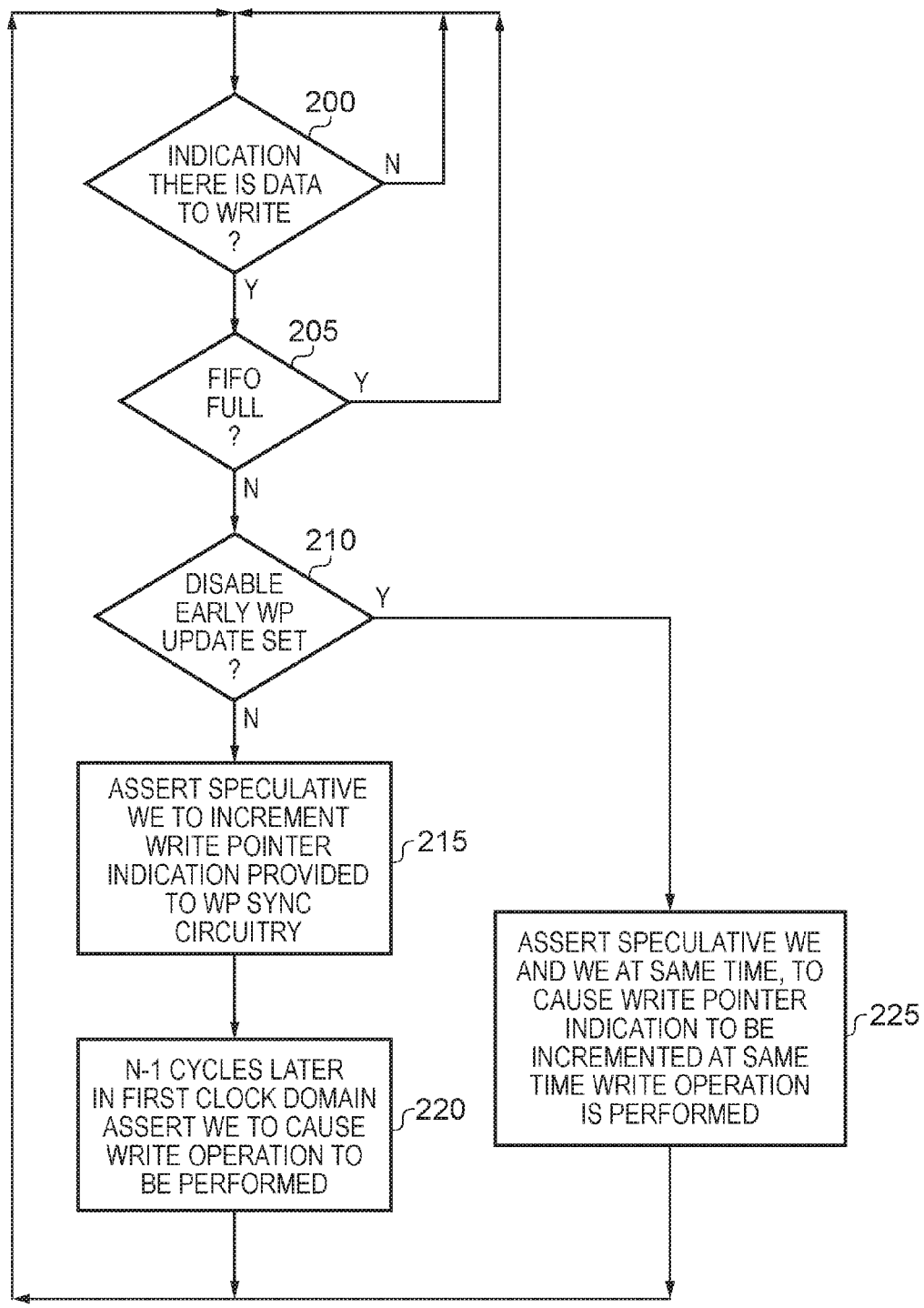
FIG. 3 is a flow diagram illustrating the operation of the control circuitry of FIG. 2 in accordance with one embodiment.

FIG. 3 is a flow diagram illustrating the operation of the circuitry of FIG. 2 in accordance with one embodiment. At step 200 it is determined whether there is an indication that data needs to be written to the FIFO 105. If there is, then it is determined whether the FIFO is full or not at step 205. If so, the process returns to step 200. It is possible that in some implementations there may be indications that there is data to write that are transitory, and that are deasserted before any write operation is actually performed. By causing step 205 to return back to step 200, this ensures that the process only proceeds beyond step 205 if, in the presence of an indication that there is data to write, the FIFO is currently determined not to be full.

At step 210, it is determined whether the early write pointer update functionality has been disabled. If so, then as shown at step 225, the speculative write enable signal and the write enable signal are asserted at the same time, to cause the write pointer indication to be incremented at the same time that the write operation is performed in the FIFO.

However, if the early write pointer update functionality has not been disabled, then at step 215 the speculative write enable signal is asserted to increment the write pointer indication provided to the write pointer synchronisation circuitry.

Thereafter, at step 220, N-1 cycles later in the first clock domain, the write enable signal is asserted to cause the write operation to be performed (as mentioned earlier N being the number of cycles in the second clock domain used by the write pointer synchronisation circuitry 150 to synchronise the write pointer indication with the second clock domain). Thereafter, the process returns to step 200.

Figure 4A:
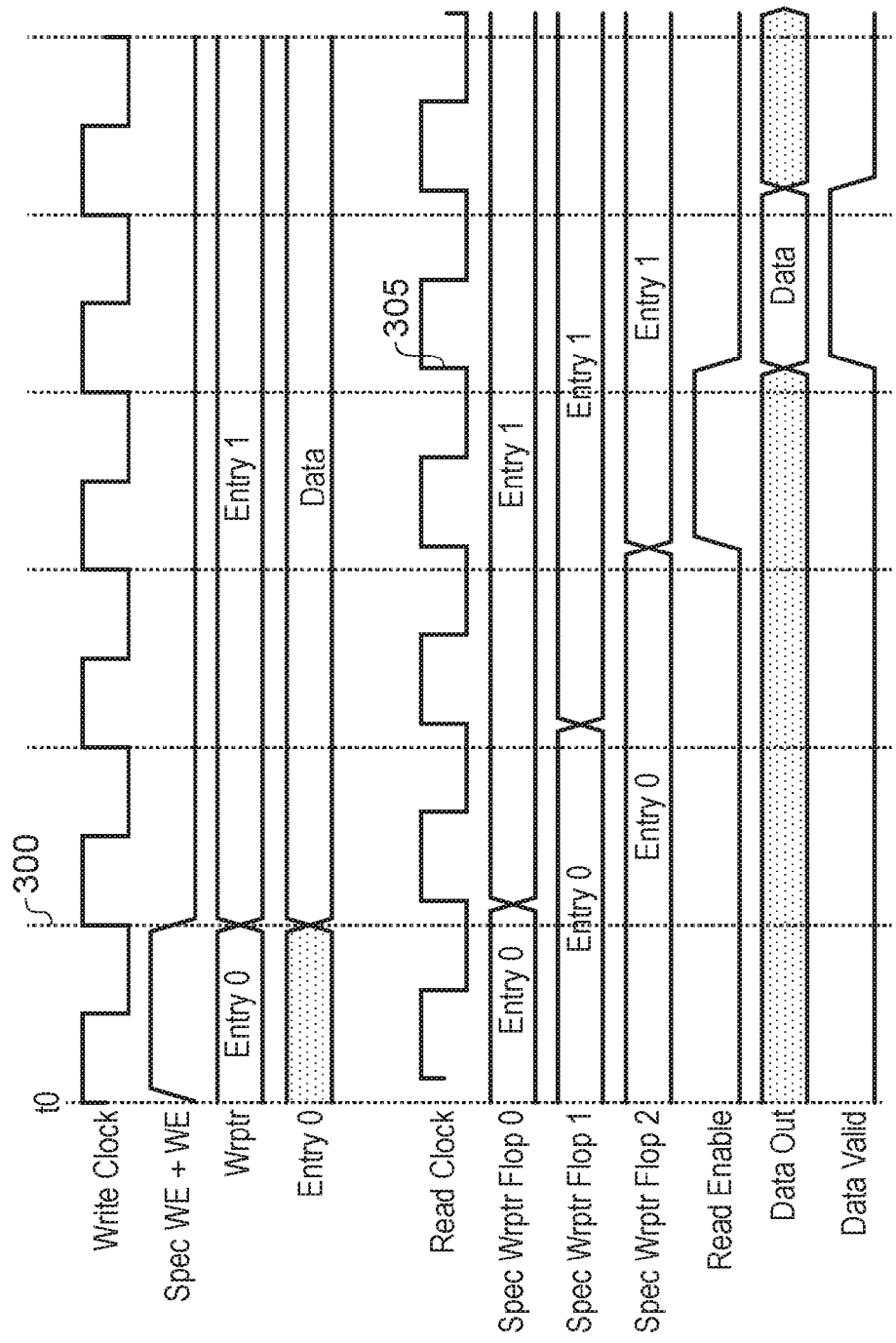
FIGS. 4A and 4B are timing diagrams illustrating a situation where the speculative write enable signal and write enable signal are updated at the same time (FIG. 4A), and a situation where the speculative write enable signal is updated two cycles before the write enable signal (FIG. 4B), in accordance with one embodiment.

FIG. 4A illustrates the latency that may be observed when the process proceeds via step 225, i.e. where it is determined that it is not safe to update the write pointer indication early. As can be seen, the data is valid and available at time 300 in the FIFO, but is actually only output from the FIFO at time 305. In contrast, when considering FIG. 4B, where the speculative write enable signal is asserted two cycles before the write enable signal, then the write data becomes valid within the FIFO entry at time 310, and is read out at time 315. This presents a significantly reduced latency when compared with the approach of figured 4A.

Figure 4B:
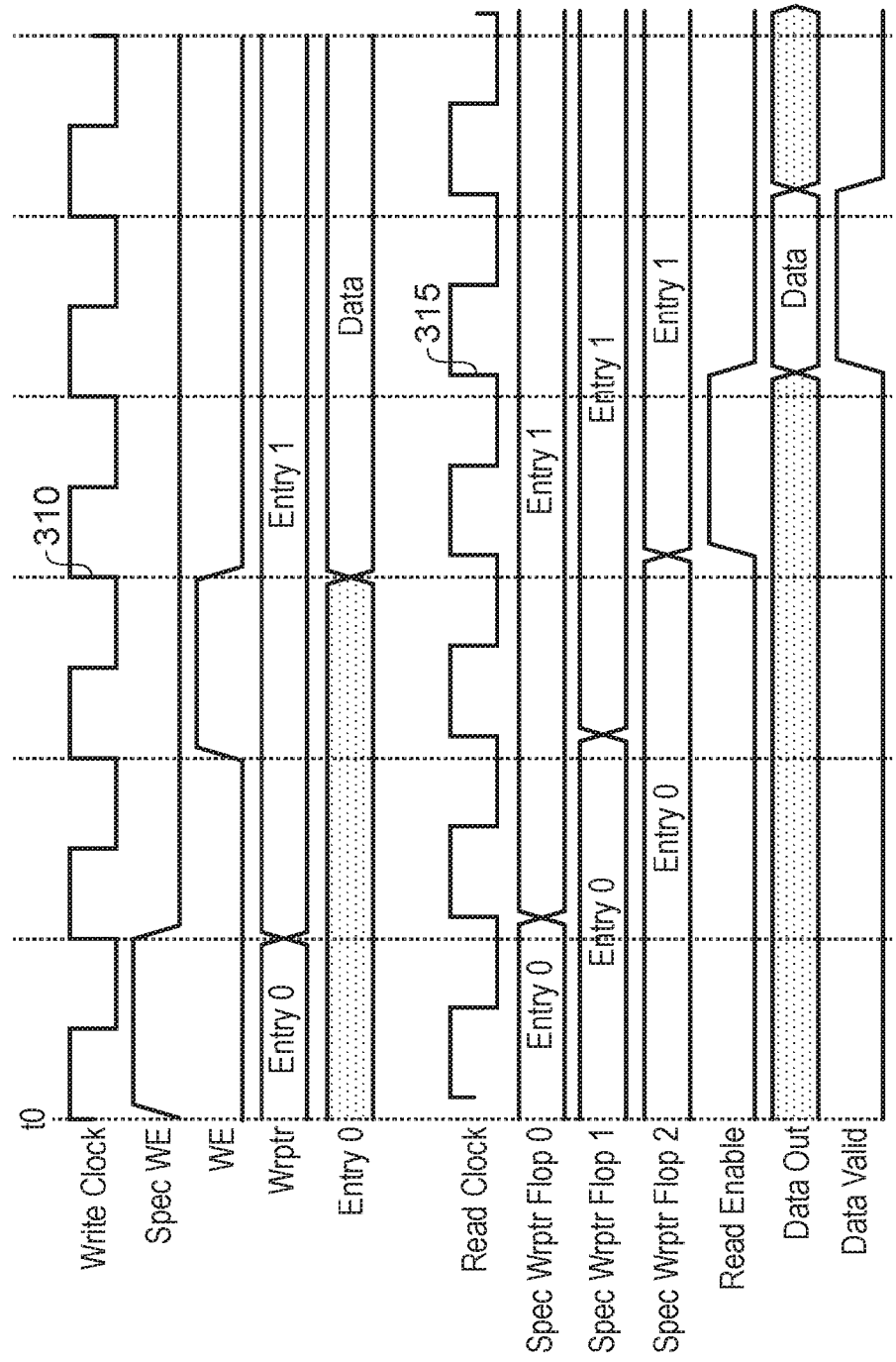

For the sake of illustration, both the first and second clocks are shown as having the same frequency, but a different phase, in FIGS. 4A and 4B, but it will be appreciated that the frequencies will also typically differ in a practical embodiment.

Figure 5:
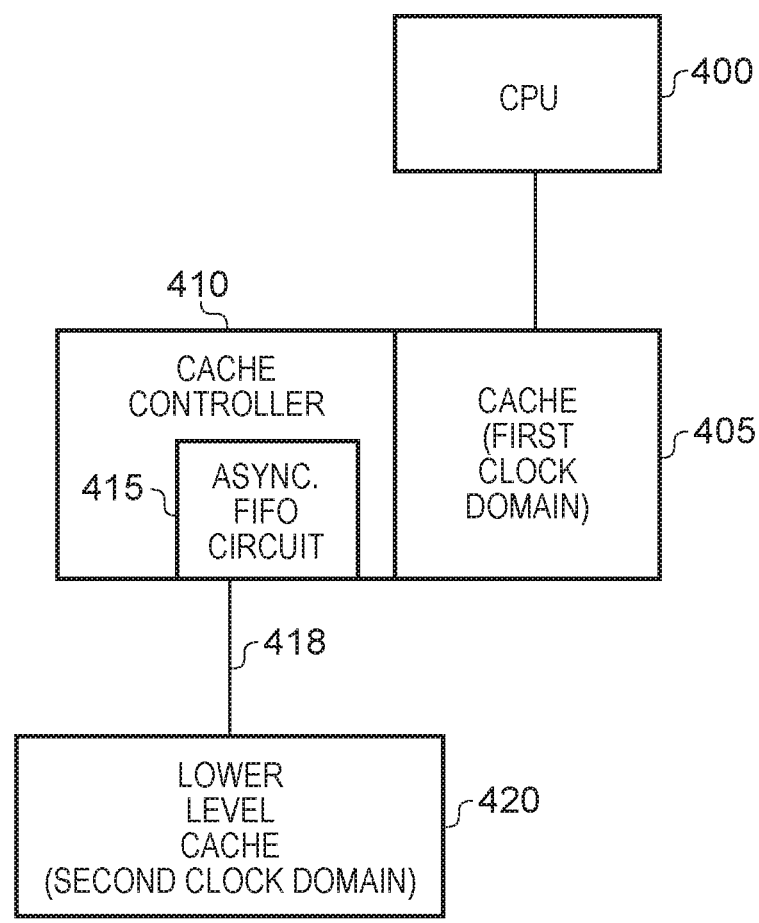
FIG. 5 illustrates the use of an asynchronous FIFO circuit of the described embodiments within a cache controller.

There are many example use cases for an asynchronous FIFO circuit as described in the above embodiments. One example use case is shown in FIG. 5, where the asynchronous FIFO circuitry 415 is included within a cache controller 410 associated with a cache 405 operating in the first clock domain. Typically, the cache 405 will be associated with a processing device such as a CPU 400. The cache 405 could for example be a level two cache accessed by the CPU 400. In such an embodiment, the cache controller will incorporate the asynchronous FIFO circuit in association with an interface between the cache 405 and a system interconnect 418. The system interconnect will then be interconnected with a variety of devices, for example a lower level cache 420. When performing a cache lookup in the cache 405, it can be speculated early in the pipeline (or simply always assumed) that there will be a miss on a cache read. In accordance with the earlier described technique, the write pointer indication could then be updated N-1 cycles (for example two cycles for the specific example earlier where N is 3) before the hit/miss condition is known. When the access misses in the level two cache 405, then the required access request is written into the FIFO along with a valid bit, just in time for it to be propagated from the asynchronous FIFO circuit onto the lower level cache 420. If instead the cache lookup hits in the level two cache, then instead of writing the access request into the FIFO, a dummy value (such as an all 0 value) could be written into the FIFO and the valid bit cleared to identify that that entry contains dummy data. As discussed earlier, the read side of the FIFO will then ignore the data read from the FIFO, and this will accordingly result in no valid access request being propagated on to the lower level cache 420.

In another example use case of FIG. 5, the asynchronous FIFO circuit 415 may be used for data being evicted from the level two cache 405. In this case, no speculation is needed, and the write pointer is simply incremented early. For example, for an eviction from the level two cache, it is known early exactly when the data will be available for propagating on to the lower level cache 420. Accordingly, the write pointer indication is incremented N-1 cycles before that data arrives from the data arrays of the cache 405. In such an embodiment, no extra valid bit needs to be included in the FIFO entries, since there will be no speculation, and there will always be real data in the FIFO entries to be evicted to the lower level cache 420.

From the above described embodiments, it will be appreciated that such embodiments provide a simple mechanism for effectively hiding the latency of the write pointer synchronisation circuitry within a storage circuit such as an asynchronous FIFO circuit. In situations where the difference in clock speed between the first and second clock domains, and the number of cycles taken by the write pointer synchronisation circuitry to synchronise the write pointer indication in the second clock domain, indicate that it is safe to do so, then the write pointer indication is updated early, one or more cycles in the first clock domain before the actual associated write operation is performed. This hides the latency of the write pointer synchronisation circuitry, and allows the write data to be propagated much more quickly through the storage structure of the storage circuit.

Although particular embodiments have been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

We claim:

1. Storage circuitry for propagating data values across a clock boundary between a first clock domain and a second clock domain, comprising:
    a storage structure having at least one entry;
    write circuitry configured to perform write operations in the first clock domain, each write operation writing a data value into an entry of the storage structure identified by a write pointer, and the write circuitry being configured to alter the write pointer between each write operation;
    write pointer synchronisation circuitry configured to receive a write pointer indication and to synchronise the write pointer indication to the second clock domain over a predetermined number of clock cycles of the second clock domain;
    read circuitry configured to perform read operations in the second clock domain, each read operation reading a data value from an entry of the storage structure identified by a read pointer, under a condition that the synchronised write pointer indication indicates that there is a data value written into the storage structure that is available to be read; and
    early update circuitry configured, for a write operation, to alter the write pointer indication provided to the write pointer synchronisation circuitry a number of clock cycles of the first clock domain before the write operation is performed, where said number of clock cycles is chosen dependent on a difference in clock speed between the first clock domain and the second clock domain and the predetermined number of clock cycles of the second clock domain over which the write pointer indication is synchronised to the second clock domain.

2. Storage circuitry as claimed in claim 1, wherein the first clock domain has a clock speed equal or greater to the clock speed of the second clock domain.

3. Storage circuitry as claimed in claim 2, wherein:
    the predetermined number of clock cycles of the second clock domain over which the write pointer indication is synchronised to the second clock domain is N clock cycles;
    the early update circuitry is configured to alter the write pointer indication provided to the write pointer synchronisation circuitry up to N-1 clock cycles of the first clock domain before the write operation is performed.

4. Storage circuitry as claimed in claim 1, wherein said at least one entry comprises a plurality of entries, and the write pointer is altered between each write operation so that each write operation is performed in respect of a different entry to a preceding write operation.

5. Storage circuitry as claimed in claim 1, wherein:
    the read circuitry is configured to alter the read pointer between each read operation; and
    said condition that the synchronised write pointer indication indicates that there is a data value written into the storage structure that is available to be read is detected when the read pointer is different to the write pointer.

6. Storage circuitry as claimed in claim 1, wherein:
    each entry of the storage structure has a valid field whose value indicates whether the data value stored therein is real data or dummy data; and
    the write circuitry is responsive to a write operation being terminated after the early update circuitry has altered the write pointer indication provided to the write pointer synchronisation circuitry, but before the entry of the storage structure identified by the write pointer has been written to, to write dummy data into the identified entry and to set the value of the valid field to identify that dummy data is stored in that identified entry.

7. Storage circuitry as claimed in claim 6, wherein the read circuitry is responsive to accessing an entry whose valid field indicates that dummy data is stored therein, to prevent the data value of that accessed entry from being output from the storage circuitry.

8. Storage circuitry as claimed in claim 1, wherein said storage structure is a FIFO (first-in-first-out) storage structure.

9. Storage circuitry as claimed in claim 1, further comprising:
    detection circuitry configured to detect a predetermined condition and to disable the early update circuitry upon detection of said predetermined condition, upon disabling the early update circuitry the write pointer indication provided to the write pointer synchronisation circuitry not being updated until the write operation is performed.

10. Storage circuitry as claimed in claim 9, wherein said predetermined condition is a condition indicating that the clock speed of the first clock domain is slower than the clock speed of the second clock domain.

11. A cache controller for a cache, comprising storage circuitry as claimed in claim 1.

12. A cache controller as claimed in claim 11, wherein the cache operates in the first clock domain and the data values comprise access requests to be propagated to a storage component in the second clock domain following detection of a miss in the cache.

13. A cache controller as claimed in claim 11, wherein the cache operates in the first clock domain and the data values comprise data evicted from the cache to a storage component in the second clock domain during an eviction operation.

14. A cache controller as claimed in claim 12, wherein the storage component comprises a further cache.

15. A method of propagating data values across a clock boundary between a first clock domain and a second clock domain in a data processing system, comprising:

providing a storage structure having at least one entry;

performing write operations in the first clock domain, each write operation writing a data value into an entry of the storage structure identified by a write pointer, and the write pointer being altered between each write operation;

employing write pointer synchronisation circuitry to receive a write pointer indication and to synchronise the write pointer indication to the second clock domain over a predetermined number of clock cycles of the second clock domain;

performing read operations in the second clock domain, each read operation reading a data value from an entry of the storage structure identified by a read pointer, under a condition that the synchronised write pointer indication indicates that there is a data value written into the storage structure that is available to be read; and for a write operation, altering the write pointer indication provided to the write pointer synchronisation circuitry a number of clock cycles of the first clock domain before the write operation is performed, where said number of clock cycles is chosen dependent on a difference in clock speed between the first clock domain and the second clock domain and the predetermined number of clock cycles of the second clock domain over which the write pointer indication is synchronised to the second clock domain.

16. Storage circuitry for propagating data values across a clock boundary between a first clock domain and a second clock domain, comprising:

a storage means for providing at least one entry;

write means for performing write operations in the first clock domain, each write operation writing a data value into an entry of the storage means identified by a write pointer, and the write means further for altering the write pointer between each write operation;

write pointer synchronisation means for receiving a write pointer indication and for synchronising the write pointer indication to the second clock domain over a predetermined number of clock cycles of the second clock domain;

read means for performing read operations in the second clock domain, each read operation reading a data value from an entry of the storage means identified by a read pointer, under a condition that the synchronised write pointer indication indicates that there is a data value written into the storage means that is available to be read; and early update means for altering, for a write operation, the write pointer indication provided to the write pointer synchronisation means a number of clock cycles of the first clock domain before the write operation is performed, where said number of clock cycles is chosen dependent on a difference in clock speed between the first clock domain and the second clock domain and the predetermined number of clock cycles of the second clock domain over which the write pointer indication is synchronised to the second clock domain.

\* \* \* \* \*